March 28, 1944.    W. A. MULHERN    2,345,283
ORNAMENTAL SHEET METAL BAND
Filed Sept. 29, 1941    2 Sheets-Sheet 1
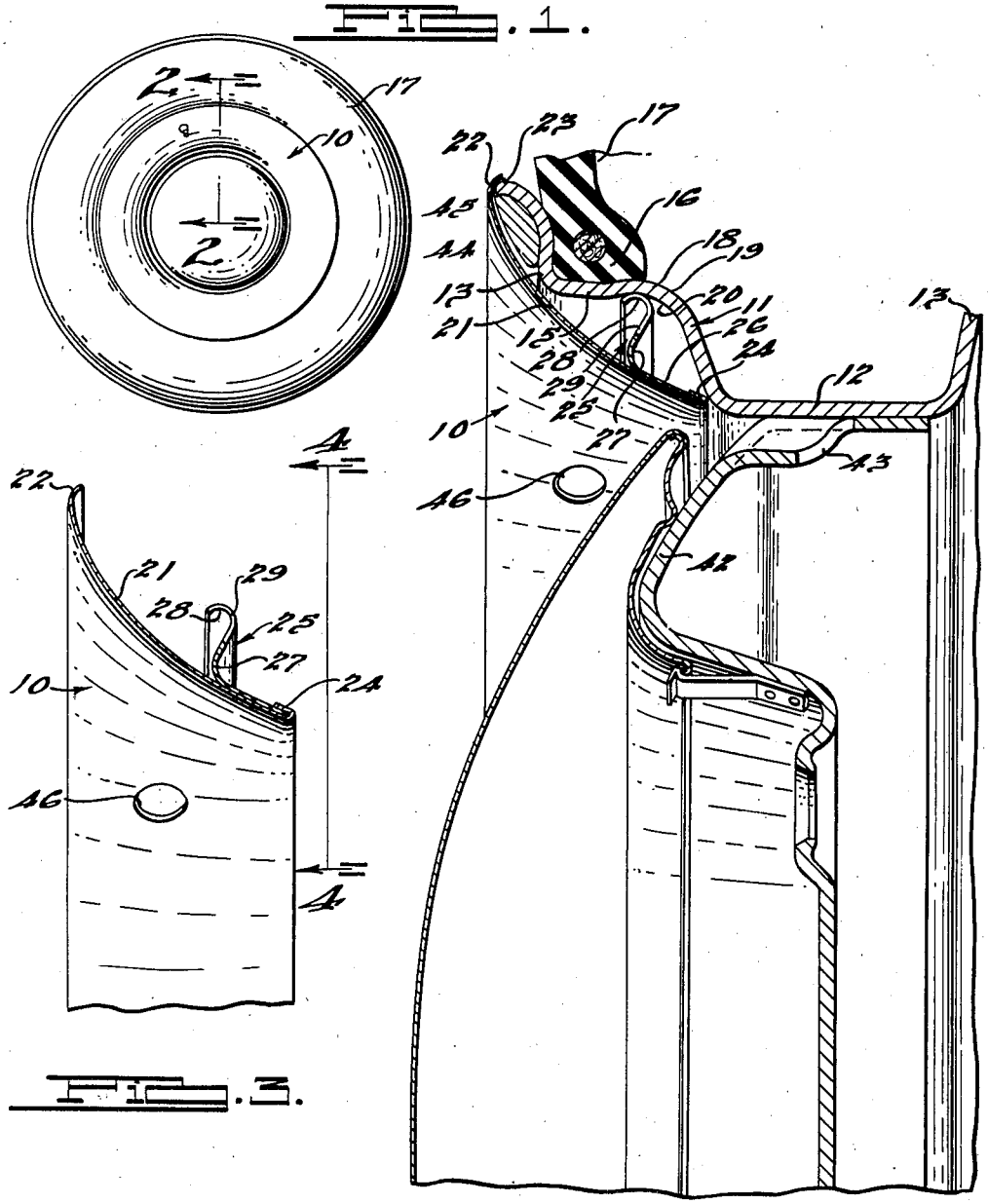
INVENTOR
William A. Mulhern.
BY
ATTORNEYS.

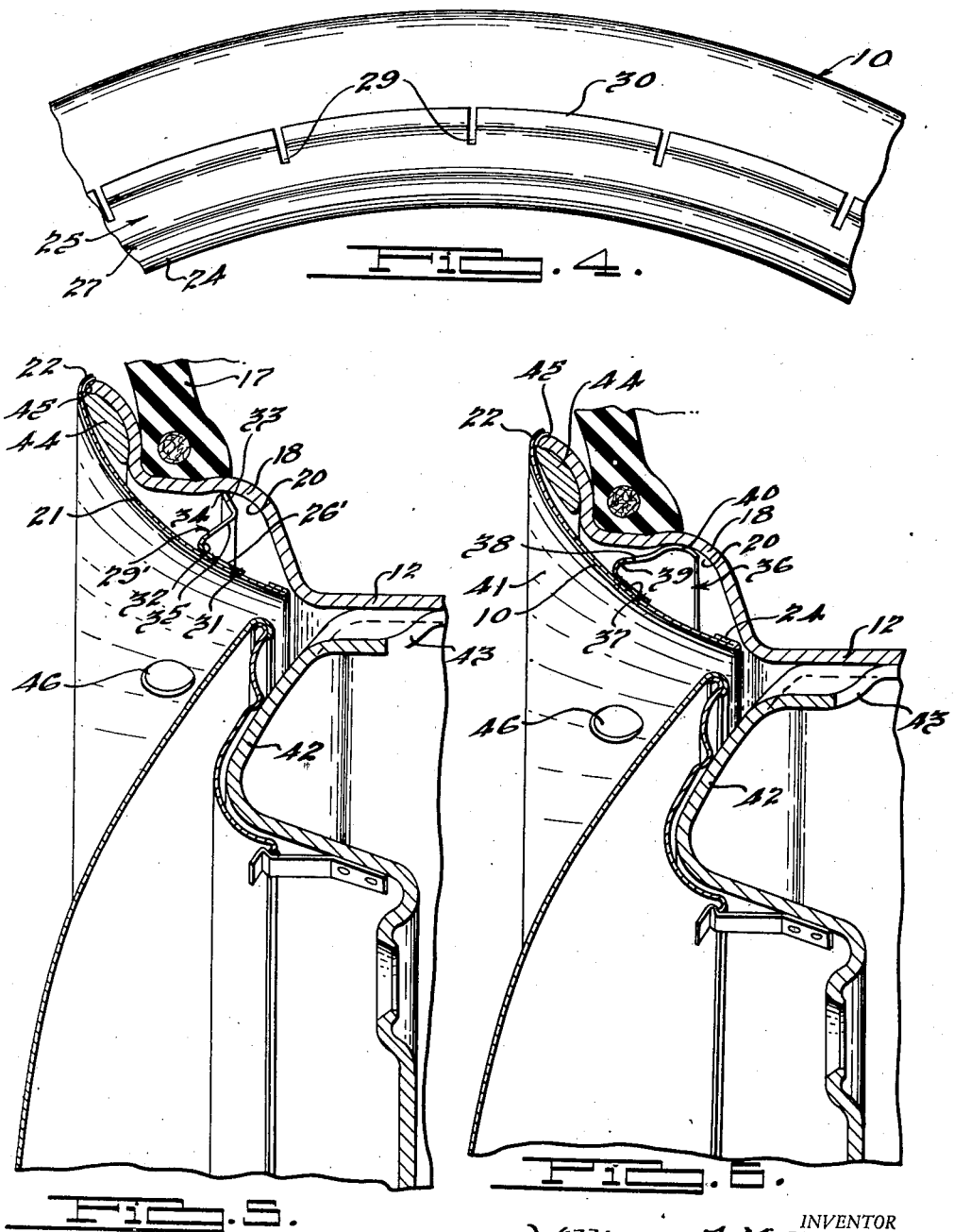

Patented Mar. 28, 1944

2,345,283

UNITED STATES PATENT OFFICE 2,345,283

ORNAMENTAL SHEET METAL BAND

William A. Mulhern, Detroit, Mich., assignor to Chrysler Corporation, Highland Park, Mich., a corporation of Delaware Application September 29, 1941, Serial No. 412,798

6 Claims. (Cl. 41—10)

This invention relates to an improved ornamental band for vehicle tire rims.

More particularly, the invention pertains to an improved band of this character which is so constructed and adapted to be arranged on a vehicle wheel as to simulate a white tire side wall.

One of the main objects of the invention is the provision of improvement means for detachably mounting a band of this kind on a tire rim so that it appears to be an arcuate continuation of the tire wall contour.

An important object of the invention is to utilize the concaved side of the hump with which tire rims of certain manufacturers are provided for the purpose of cooperating with resilient snap acting elements of the band.

A further object of the invention is the provision on an ornamental tire rim band of this kind of resilient retaining elements that yield sufficiently freely in accommodating the removal of the band from a tire rim as to guard against both correctible and incorrectible injury thereto during repeated attachments of the band to and detachment thereof from the tire rim.

A still further object of the invention is the provision of retaining members of this character which together with edge portions of a white side wall simulating band serve to position the latter in spaced relation on the external side of the tire rim.

Additional objects of the invention are to provide means for mounting an ornamental band of this kind on a tire rim which do not in any way interfere with the conventional mountings or locations of the counterbalancing weights with which accurately balanced wheel rims are frequently provided; and to provide an ornamental rim and detachable mounting members therefor which do not obstruct the tire chain strap receiving slot with which wheels of this kind are customarily provided.

Illustrative embodiments of the invention are shown in the accompanying drawings, in which:

Fig. 1 is a side elevational view of a tire, rim and hub cap assembly having a white side wall simulating band embodying the invention.

Fig. 2 is a fragmentary sectional view taken on line 2—2 of Fig. 1.

Fig. 3 is a fragmentary sectional view of the band illustrated in Fig. 2.

Fig. 4 is a fragmentary end elevational view of the band as viewed from line 4—4 of Fig. 3.

Fig. 5 is a fragmentary sectional view similar to Fig. 2 showing a modified form of the invention.

Fig. 6 is a fragmentary sectional view similar to Figs. 2 and 5 and illustrating another form of the invention.

In the form of the invention illustrated in Figs. 1 to 4, inclusive, the improved sheet metal white side wall simulating band, generally designated by the numeral 10, is shown to be mounted on a drop-center tire rim designated by the numeral 11 which includes a web portion 12 and spaced side walls 13 in which is formed a stepped section 15 that serves as a seat for a bead 16 of a tire 17. Formed in the step section 15 of the side wall of the tire rim is a hump 18 provided with a convexed outer surface 19 and a concaved inner surface 20. The hump 18 normally serves to prevent unintended inward movement of the tire bead 16 into the channel portion of the rim thereby preventing unintended removal of the tire 17 from the rim since tire rims of this character are conventionally so constructed that the tire beads will not slip over the outer extremities of the side walls of the rim unless one of the beads is seated in the channel.

The ornamental band 10 is of generally frusto-conical contour and it has a body portion 21 of arcuate cross section. The outer edge portions 22 of the band 10 are formed to an inward partial bead-like curvature and are adapted to envelop the outer edge portions 23 of the side wall of the tire adjacent which the band is disposed. The inner edge portion 24 of the band 10 is reversely folded upon the adjacent part of the body portion of the band to provide a rounded extremity which is adapted to seat against the side wall of the tire rim in the vicinity of the web 12 thereof. The fastening member generally designated by the numeral 25 is disposed between the inner marginal portions of the band 10 and the part of the tire wall in which the hump 18 is formed. The fastening member 25 comprises a sheet metal ring 26 having an edge portion formed to conform with the curvature of and lie adjacent the inner edge portion of the body part 21 of the band 10. The right edge of the sheet metal ring 26 is clampingly engaged by the folded over edge portion 24 of the ornamental band in such a manner as to securely fix the fastening member to the latter.

The intermediate part of the sheet metal ring 26 is bowed in cross section slightly reversely as indicated at 27 so as to bring this part of the ring into upstanding relation with respect to the body portion 21 of the band. The free end portion 28 of the sheet metal ring 26 is bent in a direction opposite to the bent intermediate portion 27 and provided with a curvature such that it has a snap acting engagement with the concaved side 20 of the hump 18. Slots 29 are formed in the free end and upstanding intermediate portions of the sheet metal ring 26 to provide therebetween circumferentially arranged resiliently yieldable tongues 30 which serve to detachably secure the band 10 to the tire ring. The band 10 may be conveniently removed from the tire rim by engaging a suitable tool not shown under the folded edge portion 24 and prying the band outwardly from the rim wall 13.

In the form of the invention illustrated in Fig. 5, the ornamental band 10 is substantially identical in construction to that shown in Figs. 1 to 4, inclusive, the fastening member 29' of this form of the invention being substantially the only part which differs from the structure shown in Figs. 1 to 4. This fastening member includes a sheet metal ring 26' which may be welded or otherwise fixed as at 31 to the body portion 21 of the band. The sheet metal ring 26' has an intermediate portion 32 which is slightly reversely bent so as to bring the free end portion of the band of the ring into upstanding relation with respect to the body portion of the band 21. The outer marginal portion 33 of the ring 26' is angularly disposed with respect to the intermediate part of the ring in order to bring the outermost extremity 34 of the ring into abutting engagement with the concaved side 20 of the hump 18. The free end part of the intermediate portion of the ring 26' is slotted at 35 in order to provide a plurality of circumferentially arranged tongues which serve to cooperate with the concaved side of the hump 18 and detachably mount the band on the tire rim.

The ornamental band shown in the form of the invention illustrated in Fig. 6 is substantially identical to that shown in Figs. 1 to 5, inclusive, with the exception that the retaining ring member generally designated by the numeral 36 is of somewhat different construction. In this form of the invention the retaining member 36 comprises a sheet metal ring and a base portion 37 riveted, welded or otherwise suitably fixed on the upper side of the band 10 and an intermediate portion 38 which is bent inwardly with respect to the tire rim at 39 and provided on its free extremity with an arcuately curved part 40 which is adapted to seat in the concaved side 20 of the hump 18. The curved portion 40 is bent in the same direction as the bent intermediate part 38 of the ring and is adapted to yield in accommodating removal of the ornamental band from the tire rim.

In all the forms of the invention shown in the drawings, the exterior surface 41 of the ornamental band is painted or otherwise colored white to simulate a white tire side wall. The inner folded edge portion of the ornamental band, in each form of the invention, terminates substantially at the web portion 12 of the rim which, in conventional practice, is fixed to a disk 42 having tire chain receiving slots 43 therein. With this band location and mounting, the tire chain receiving slots 43 are not obstructed by the white side wall simulating band and these slots are therefore made available for attachment of tire chains if desired. The outer edge portions of the ornamental band 10 are so constructed and arranged as to accommodate the usual mounting of counterweights 44 adjacent the outer marginal portions of the side wall of the tire rim in accordance with conventional practice. When the counterbalance weights 44 are attached to the rim by clips 45, these clips may be enveloped by the curved edge portions 22 of the band as illustrated in the drawings.

Ornamental bands embodying the invention may be repeatedly removed and replaced without requiring any correction of the fastening means which are so constructed as to resiliently yield without being subjected to permanent deformation or other injury during removal of the bands. This facilitates convenient mounting of the bands on a tire and rim assembly and proper placement of a valve receiving aperture 46 with which the band 10 is provided with respect to the valve of the tire.

Although but several specific embodiments of the invention have been herein shown and described, it is to be understood that various changes in the size, shape and arrangement of parts may be made without departing from the spirit of the invention.

I claim:

1. An ornamental sheet metal band adapted to be disposed adjacent the inner side of a vehicle tire rim having a drop-center channel and a stepped side wall provided with a circumferentially extending outwardly convexed and inwardly concaved hump including a transversely arcuate body portion of generally frusto conical shape, an inwardly curved outer edge portion adapted to substantially envelop the outermost edge of the side wall of said rim and to extend inwardly around said edge beyond the side plane of said rim, and tongues on said band having resiliently deflectable portions adapted to engage in the concaved side of said hump and to bear thereon in a direction to yieldably urge said inwardly curved edge portion against said edge of said side wall for detachably holding said band on said rim, said tongue having a reverse bend adjacent said band and the portion thereof extending from said bend being inclined with respect to said side plane of said rim in a direction inwardly of the latter for accommodating deflection about said bend during detachment of said band.

2. An ornamental sheet metal band adapted to be disposed adjacent the inner side of a vehicle tire rim having a drop-center channel and a stepped side wall provided with a circumferentially extending outwardly convexed and inwardly concaved hump including a transversely arcuate body portion of generally frusto conical shape, having an edge portion engageable with said rim, and a retaining member fixed to the inner edge portions of said band comprising a sheet metal ring having a plurality of resiliently deflectable tongues extending from its periphery and provided with free end portions adapted to extend into the concaved side of said hump for detachably holding said band on said rim, each of said tongues having a reverse bend adjacent said band and the portion thereof projecting from said bend extending inwardly toward the central radial plane of said rim at an inclination to said plane in order to accommodate flexure about said bend without compressing said projecting portion in a direction transversely of its thickness during outward displacement of said band from said rim.

3. An ornamental sheet metal band adapted to be disposed adjacent the inner side of a vehicle tire rim having a drop-center channel and a stepped side wall provided with a circumferentially extending outwardy convexed and inwardly concaved hump including a transversely arcuate body portion of generally frusto conical shape, an inwardly curved outer edge portion adapted to substantially envelop the outermost edge of the side wall of said rim, and a retaining member fixed to the inner edge portions of said band comprising a sheet metal ring having a plurality of resiliently deflectable tongues extending from its periphery and each provided with a free end part having curved side surface portions adapted to fit in the concaved side of said hump and a reverse bend adjacent said ring, the portion of each tongue between said reverse bend and said free end part being inclined from said bend inwardly of said rim for accommodating displacement of said free end part from said concaved side of said hump by flexure of said tongue about said reverse bend and without compressing said portion of said tongue in a direction normal to its thickness.

4. An ornamental sheet metal band adapted to be disposed adjacent the inner side of a vehicle tire rim having a drop-center channel and a stepped side wall provided with a circumferentially extending outwardly convexed and inwardly concaved hump including an outer part adapted to seat against an outer portion of said rim, a folded inner edge portion, and a retaining member including a sheet metal ring clamped between said body part and said folded edge portion thereof and having a plurality of resiliently deflectable tongues extending from its periphery and each provided with free end portions adapted to extend into the concaved side of said hump for detachably holding said band on said rim and each tongue having a reverse bend adjacent said ring, the portion of said tongue between said free end portion and said reverse bend being inclined from said bend inwardly of said rim.

5. An ornamental sheet metal band adapted to be detachably secured to a drop-center stepped rim having a tire bead engaging hump provided with concaved and convexed lower and upper sides respectively comprising a generally frusto-conical body portion of arcuate cross sectional contour provided with a white exterior side surface for simulating a white tire side wall, said body portion having an inwardly curved outer edge portion adapted to envelop the outer edge portion of a tire rim wall and having an inner edge portion registerable with the web part of said tire rim, and a retaining member fixed to the inner edge portions of said band comprising a sheet metal ring having a plurality of resiliently deflectable tongues extending from its periphery and provided with free end portions adapted to extend into the concaved side of said hump for detachably holding said band on said rim, each of said tongues having a reverse bend adjacent said ring and an intermediate portion between said free end portion and said bend inclined from the latter toward the central radial plane of said rim.

6. An ornamental sheet metal band adapted to be detachably secured to a drop-center stepped rim having a tire bead engaging hump provided with concaved and convexed lower and upper sides respectively comprising a generally frusto-conical body portion of arcuate cross sectional contour provided with a white exterior side surface for simulating a white tire side wall, said body portion having an inwardly curved outer edge portion adapted to envelop the outer edge portion of a tire rim wall and having an inner edge portion registerable with the web part of said tire rim, and a plurality of tongues circumferentially arranged about the inner edge portions of said band, said tongues comprising resilient sheet metal and having an intermediate portion between a pair of oppositely formed bends therein and having a free end portion adapted to engage in the concaved side of said hump for detachably holding said band on said rim.

WILLIAM A. MULHERN.